United States Patent
Loveria, III

(10) Patent No.: US 7,360,085 B2
(45) Date of Patent: Apr. 15, 2008

(54) METHOD AND SYSTEM FOR PROVIDING A SECURE MULTIMEDIA PRESENTATION

(75) Inventor: Gregorio O. Loveria, III, Conklin, NY (US)

(73) Assignee: NAMS International Incorporated, Conkcin, NY (US)

( * ) Notice: Subject to any disclaimer, the term of this patent is extended or adjusted under 35 U.S.C. 154(b) by 949 days.

(21) Appl. No.: 10/622,155

(22) Filed: Jul. 15, 2003

(65) Prior Publication Data
US 2004/0090466 A1    May 13, 2004

Related U.S. Application Data

(63) Continuation-in-part of application No. 09/435,999, filed on Nov. 8, 1999, now abandoned.

(51) Int. Cl.
*H04L 9/00* (2006.01)
(52) U.S. Cl. .................... 713/165; 713/164; 713/150
(58) Field of Classification Search ................ 713/165, 713/150, 164
See application file for complete search history.

(56) References Cited

OTHER PUBLICATIONS

Dimitri Konstantas and Dimitris Thanos, "Commercial Dissemination of Video over Open Networks: Issues and Approaches," Internet Objects, Centre Universitaire d'Informatique, University of Geneva, Sep. 2000.*

"Copy protection for high-definition baseband video" Barr, D.A. Information Technology: Coding and Computing, 2000. Proceedings. International Conference on, Vol., Iss., 2000 pp. 174-177.*
When computer security crases into multimedia Tygar, J.D.; Multimedia, Seventh IEEE International Symposium on Dec. 12-14, 2005 Page(s):1 pp.*
Multimedia Security Gateway Protocol to achieve anonymity in delivering multimedia data using watermarking Narang, S.; Grover, P.S.; Koushik, S.; Multimedia and Expo, 2000. ICME 2000. 2000 IEEE International Conference on vol. 1, Jul. 30-Aug. 2, 2000 pp. 529-532 vol. 1.*
A Petri-net based multilevel security specification model for multimedia documents Joshi, J.; Ghafoor, A.; Multimedia and Expo, 2000. ICME 2000. 2000 IEEE International Conference on vol. 1, Jul. 30-Aug. 2, 2000 pp. 533-536 vol. 1.*

* cited by examiner

*Primary Examiner*—David Jung
(74) *Attorney, Agent, or Firm*—NAMS International, Inc.; G. Loveria

(57) ABSTRACT

The invention comprises a secure method and apparatus for the distribution, processing, decryption, and display of combinations of encrypted audio, video, raster graphic still images, vector graphic images, HTML, hyperlinks, textual information, synchronization information, and password and date expiration data combined and encrypted in singular multimedia presentation transmission and distribution files, all of which are represented by binary data files. The invention may be adapted for use with any of the various audio, video, raster graphic still images, vector graphic images, and text data formats and files that represent such information. A specific embodiment of the invention adapted for use on a personal computer and such CPU equipped devices is presented.

15 Claims, 7 Drawing Sheets

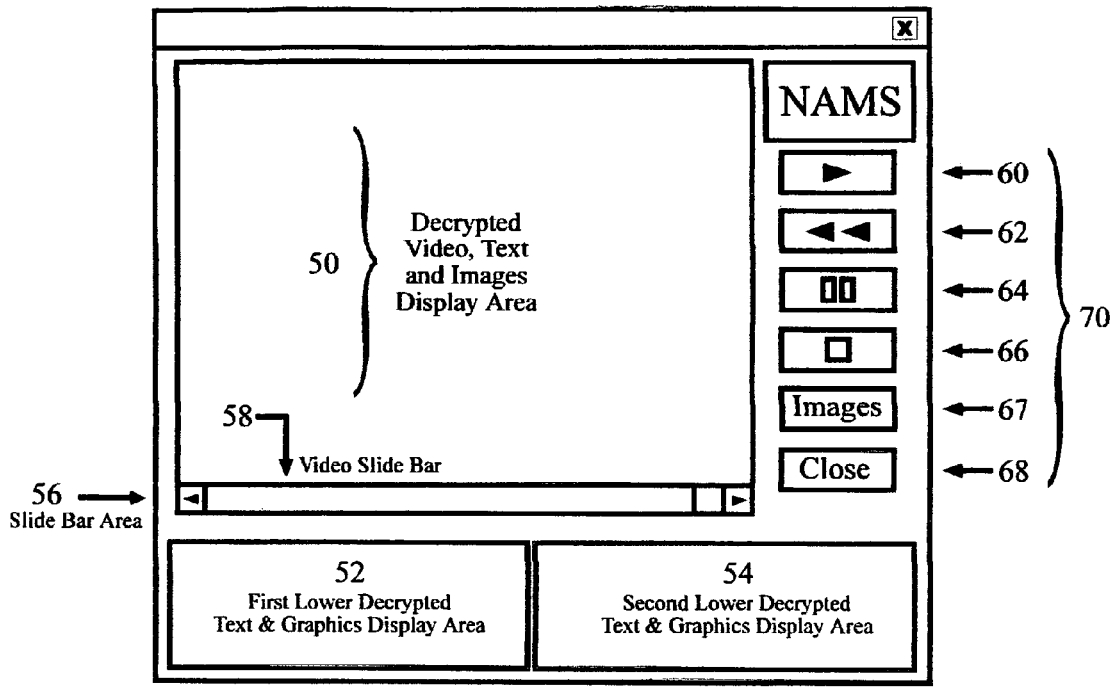

Figure 7

| Element | Element Description Table for Figure 7 |
|---|---|
| 50 | Primary Decrypted Video Display Area Fixed Within Interface, Also Displays Decrypted Hyperlinked Text and/or Images, Dictated By User Control Array (70) |
| 52 | First Lower Text Display Area Fixed Within Interface Which Continuously Displays Decrypted Hyperlinked Text and/or Graphics During Video Playback in Element 50 |
| 54 | Second Lower Text Display Area Fixed Within Interface Which Continuously Displays Decrypted Hyperlinked Text and/or Graphics During Video Playback in Element 50 |
| 56 | Slide Bar Area - Video Slide Bar Area Appears Only When User Control 60 is Enabled, Replacing Decrypted Hyperlinked Text &/or Graphics in Element 50 with Motion Video |
| 58 | Video Slide Bar - Video Slide Bar Appears Only When User Control 60 is Enabled, Replacing Decrypted Hyperlinked Text &/or Graphics in Element 50 with Motion Video |
| 60 | User Control - Decrypt & Play Video in Area 50, Enable Video Slide Bar Area 56 and Slide Bar 58, Replace Decypted Text or Decrypted Raster or Vector Images/Graphics in 50 |
| 62 | User Control - Rewind to Start of Decrypted Video, Video Slide Bar 58 Still Enabled |
| 64 | User Control - Pause Video, Leave Frame Onscreen, Video Slide Bar 58 Still Enabled |
| 66 | User Control - Stop Video, Clear 50 of Motion Video, Replace Video With Decrypted Text In RAM in 50, Remove Video Slide Bar 58, Disable Video Slide Bar Area 56 |
| 67 | User Control - Clear 50 of Decrypted Textual Information, ASCII, Hyperlinks, HTML & Rich Text, Display Decrypted Raster or Vector Images in Synchronized Sequences in 50 |
| 68 | User Control - Close Interface, Stop Video and Remove All Mutimedia From Memory |
| 70 | User Control Array - Decrypt & Play Video 60, Rewind Video 62, Pause Video 64, Stop Video 66, Show Decrypted Images Sequence 67, Close Interface & Program 68 |

METHOD AND SYSTEM FOR PROVIDING A SECURE MULTIMEDIA PRESENTATION

This application is a continuation in part of application Ser. No. 09/435,999 filed 8 Nov. 1999 abandoned 15 Jul. 2003.

COPYRIGHT NOTICE

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Synchronized combinations of audio, video, raster still images and graphics, vector motion and still images and graphics, HTML, hyperlinks, Rich Text and other text are generically referred to as video clips. Through digitization, the electromagnetic signals which are used to represent each of these video clip components may be reduced to binary data files. These files may be stored in encrypted combinations as an encrypted video clip data file, encrypted in its entirety, and may be transferred to and decrypted and displayed by display units and other devices which are capable of decrypting and processing for display and playback of the encrypted video clip data file which contains the encrypted multimedia presentation.

One way of distributing the encrypted video clip data involves placing encrypted video clip data files on file servers which are accessible to users of digital computer systems through channels such as the Internet and analogous subscription network services. Alternate distribution and transmission methods include radio frequencies (RF) and other such broadcast frequencies and distribution methods such as those used by analog and digital radio and television, cellular phones, and personal data assistants (PDAs) for playback and decryption of the multimedia presentation on these and other such wireless reception devices. Ideally, such users could locate the encrypted video clip data file, discern the data formats of the encrypted video clip data components by the data identifier and its unique file extension as an encrypted multimedia presentation data file, receive the file and decrypt, process and playback the video clip data on their digital computer systems and other devices with a CPU, output display and audio capabilities to achieve display and interactive playback of the video clip as a decrypted and secure multimedia presentation.

However, to date there exists no organized system for facilitating the identification, distribution, transmission and playback of the data formats of the encrypted component data files which are comprised and stored within the encrypted multimedia presentation data file, nor is there presently a digital computer system based and automatically decrypting video clip display unit which is capable of providing a coherent and synchronized display of the combination of decrypted audio, decrypted video, decrypted still raster images and graphics, decrypted still and motion vector images and graphics, decrypted HTML, decrypted Rich Text, decrypted hyperlinks, decrypted password data, decrypted date expiration data and decrypted text represented by the data contained in such a an encrypted video clip data file.

SUMMARY OF THE INVENTION

The present invention is intended to overcome the obstacles inherent in the state of the art and to provide users of digital computer systems and other devices with a CPU and display and audio capabilities, with the ability to access server-based encrypted video clips in a single multimedia presentation transmission file which contains encrypted audio, video, still raster images and graphics, still and motion vector images and graphics, HTML, Rich Text, hyperlinks, password data, date expiration data, text and other textual data to use their digital computer systems and other devices, such as Personal Data Assistants (PDAs), portable computers and cellular phones as video clip display units to view decrypted multimedia presentations.

The invention may be practiced as a method for transmitting and distributing an encrypted video clip file, encrypted in its entirety for security purposes, represented by encrypted data contained in a an encrypted video clip data file. The encrypted multimedia presentation file is transmitted from a file server, which is also able to be broadcast wirelessly via analog and digital RF and other broadcast telecommunication frequencies, to users for display on a digital computer system or other devices with a CPU and output display with audio capabilities, or as a method or apparatus for the display on a video clip display unit of decrypted video clips represented by encrypted data stored in a an encrypted video clip data file.

The invention is particularly intended to integrate the secure transmission, broadcast, reception, decryption, playback and display of an encrypted multimedia presentation to end users with personal computers and to those users equipped with devices that have a CPU and a display output with audio capabilities, which facilitates the secure display of decrypted audio, video, still raster images and graphics, still and motion vector images and graphics together with the display of decrypted textual information such as HTML, Rich Text and hyperlinks, relating to the audio, video, and images being displayed, and which all presentation data files can be protected further with encrypted password data and date expiration data.

BRIEF DESCRIPTION OF DRAWINGS

FIG. 7 illustrates a video clip user interface capable of playing back non-encrypted multimedia presentations and decrypting and playing back encrypted multimedia presentations displayed by a specific embodiment of the invention.

DETAILED DESCRIPTION OF THE INVENTION

Figure 1:
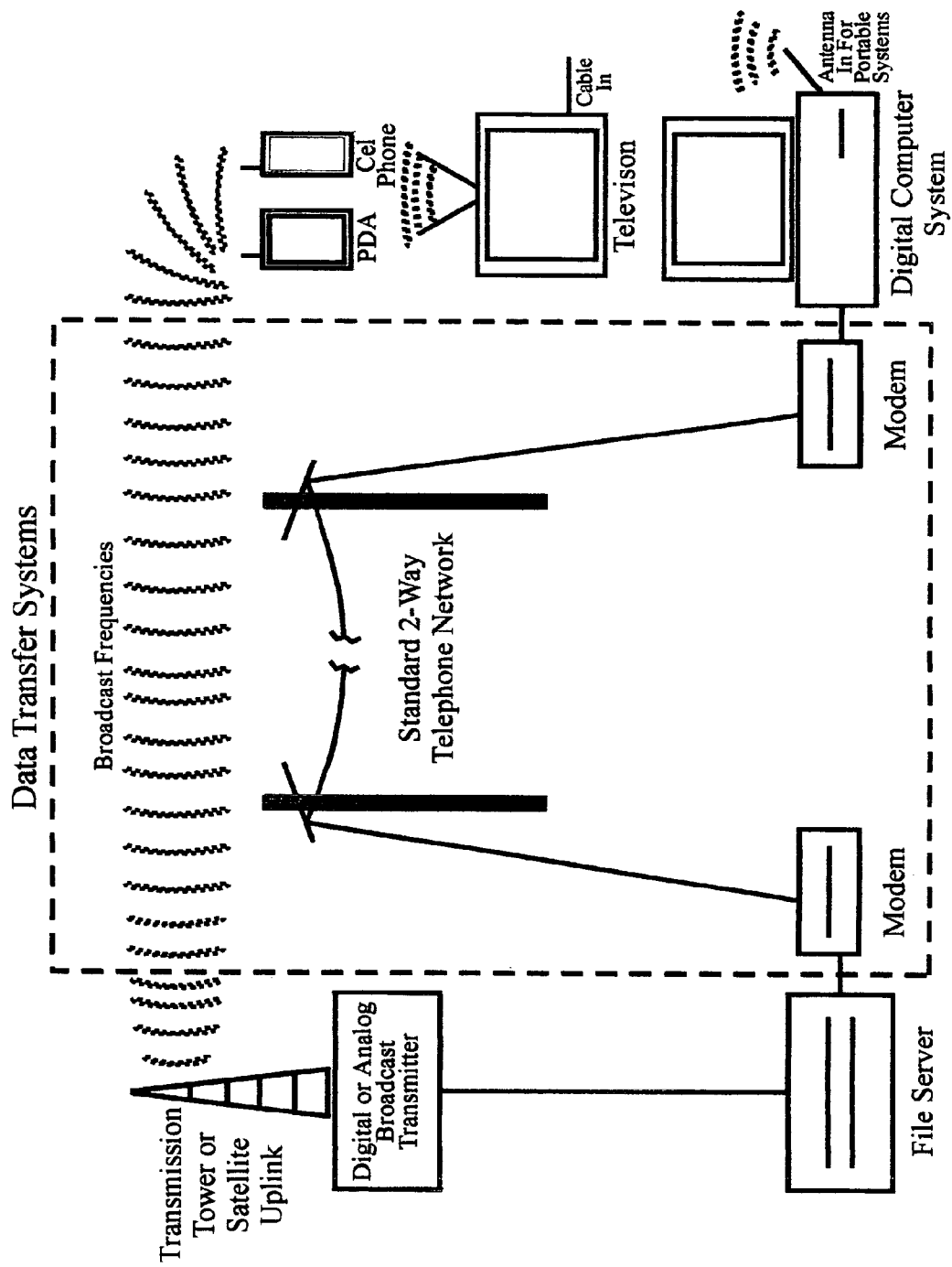
FIG. 1 illustrates a system for the distribution and transmission of encrypted video clip data files containing encrypted multimedia component files which comprise an encrypted multimedia presentation file, from a file server to a digital computer system and alternately being wirelessly transmitted and broadcast digitally and analogously to any other device capable of receiving such broadcasts with a CPU, an output display device and an audio output device, to decrypt and playback the interactive multimedia presentation data and files.

FIG. 1 shows a generic representation of a server-based encrypted video clip data file distribution system and a broadcast wireless file distribution system both of which utilize commonly known digital and analog data transfer technologies. In both distribution systems, a file server having the capacity to store large amounts of binary data holds groups of binary data representing the combined component signals of individual encrypted video clips that contain encrypted multimedia presentations. Using wireless communication systems and devices, such as Personal Data Assistants and cellular telephones, the encrypted multimedia presentation can be sent by one user to other end users without a file server, however, in a wired data transfer system, the file server links and directly transfers the encrypted multimedia presentation file by frame packet relay transmission means to a remote digital computer systems. The wired data transfer system consists of one or more modems, which are attached to the file server which serve as a link between the file server and a telephone system. The modem is a device which is capable of transmitting and receiving an audio-band signal which is representative of binary data. Through the telephone, cable, satellite and wireless telecommunication systems, one modem can communicate such a representative audio signal to another modem, thereby effectively communicating the contents of the encrypted video clip data file which the audio signal represents. A second modem at the end of the data transfer system may then communicate the encrypted video clip data file to the binary data file repository of a digital computer system, comprised of a data storage unit, a data processing unit, and audio and video display units, where the data will be available for subsequent processing and display. In wireless systems the encrypted video clip data containing the encrypted multimedia presentation information, files and data are mass distributed directly using telecommunication frequencies to individual end users of devices such as PDAs, cellular phones and also to television viewers. Alternately, in the wireless system using wireless devices such as PDAs, cellular phones and portable computers, the encrypted multimedia presentation can be sent by one user to other end users without a file server. Future advances in telecommunications technology are expected to facilitate direct communication of digital data, eliminating the need for intermediate modulation and demodulation steps.

Figure 2:
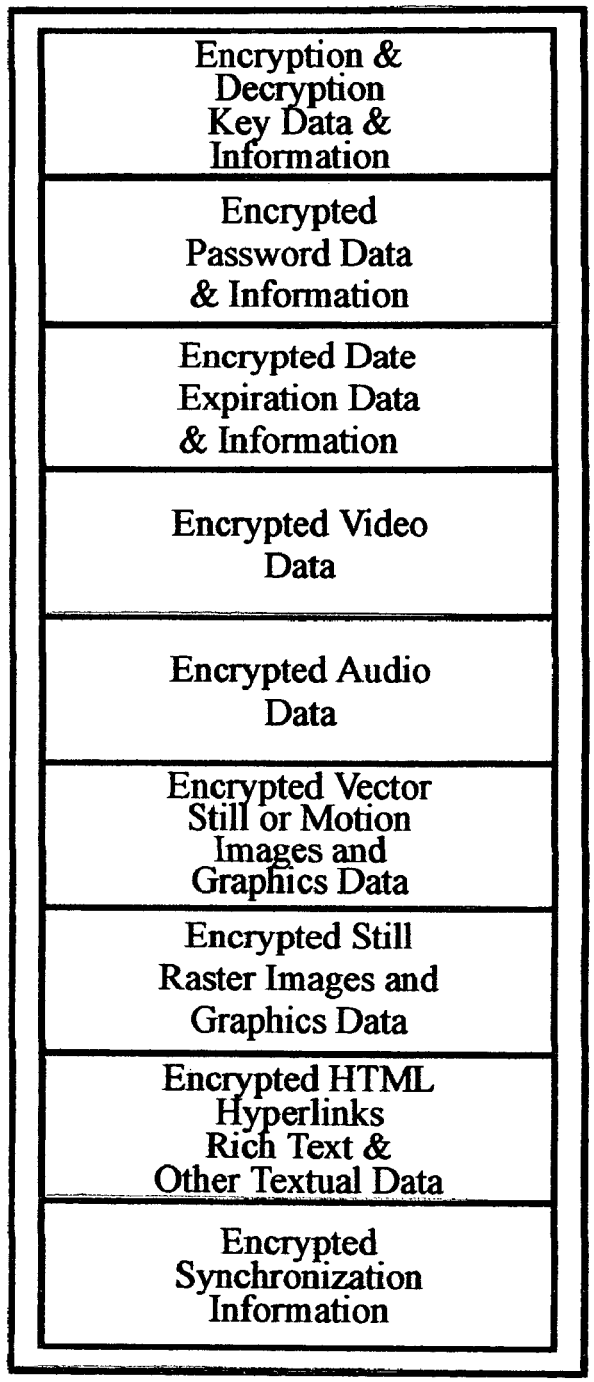
FIG. 2 illustrates the components which comprise a video clip data file that constitute a secure and encrypted multimedia presentation transmission and distribution file.

An encrypted video clip data file contains encrypted multimedia data representative of all of the components of the multimedia presentation video clip file which it represents. FIG. 2 shows the component data and information which would be contained in a an encrypted video clip data file representative of video clip data file components comprising an encrypted multimedia presentation consisting of encryption and decryption key data and information, encrypted password data and information, encrypted date and time expiration data and information, encrypted video data and encrypted data file video images, encrypted audio signals, encrypted audio data and encrypted audio data files, encrypted vector still and motion images and graphics data information and files, encrypted still raster image data information and files, encrypted HTML, encrypted hyperlinks, encrypted Rich Text, encrypted ASCII text and other encrypted textually related data information and files and encrypted synchronization data and information. In addition to data representative of the contents of the encrypted video clip, the video clip data file must contain some information which indicates to the video clip display unit how the decrypted video and audio and other decrypted components are to be synchronized as well as how the decrypted multimedia presentation is synchronized. If the decrypted component data are maintained as separate groups of data, the decrypted synchronization information may consist of a separate group of decrypted synchronization data, such as a table which contains data indicating points of temporal correlation between the various decrypted video clip components. The display of a decrypted video clip represented by such data could be implemented through a method such as non-preemptive multitasking, wherein segments of each type of decrypted data are sequentially processed and displayed. Alternatively, some or all of the component data of the decrypted video and audio data and files could be organized in an interleaved data format, which would consist of one or more data files in which segments of the separate component data are arranged and identified serially, in approximately the same order as that in which they would be accessed for display if stored separately. Alternatively, some or all of the component data within the encrypted multimedia presentation file could also be organized in a non-interleaved format.

A user wishing to obtain and playback encrypted video clip data files from a file server and through wireless broadcast means must be provided with all of the encrypted component data as shown in FIG. 2. This is achieved by transferring the complete secure encrypted multimedia presentation data file instead of insecurely transferring each non-encrypted component data file individually. The optimal way of making this data available is to archive and encrypt any separately maintained component data files into a single encrypted video clip data file identified by a single video clip data file identifier. This may be achieved by using any known archiving and encryption algorithms. Additionally, it is optimal to inform the potential user as to the type and quality of the audio, video, and still image signals which are represented by the component data contained in the encrypted multimedia presentation video clip data file.

This may be accomplished by assigning a unique identifier to which is representative of the type and quality of component signals to each component data file. An audio component file type identifier may be used, for example, in conjunction with the eight character file identifier standard of operating systems such as DOS and WINDOWS.

When used in conjunction with a file identifier in a systematic and conspicuous manner, such as by systematically incorporating the format identifier as the last two characters of the file identifier, the type and quality of the audio component of the video clip audio may be discerned through reference to a table of file format identifiers. Similar identifiers may be adopted for representation of the component file data types of encrypted video, encrypted still images, encrypted text, and the encrypted interleaved and non-interleaved component data files. File type identification may be accomplished manually or may be automated through the use of a look-up table embodied within the decrypting video clip display playback unit.

Figure 3:
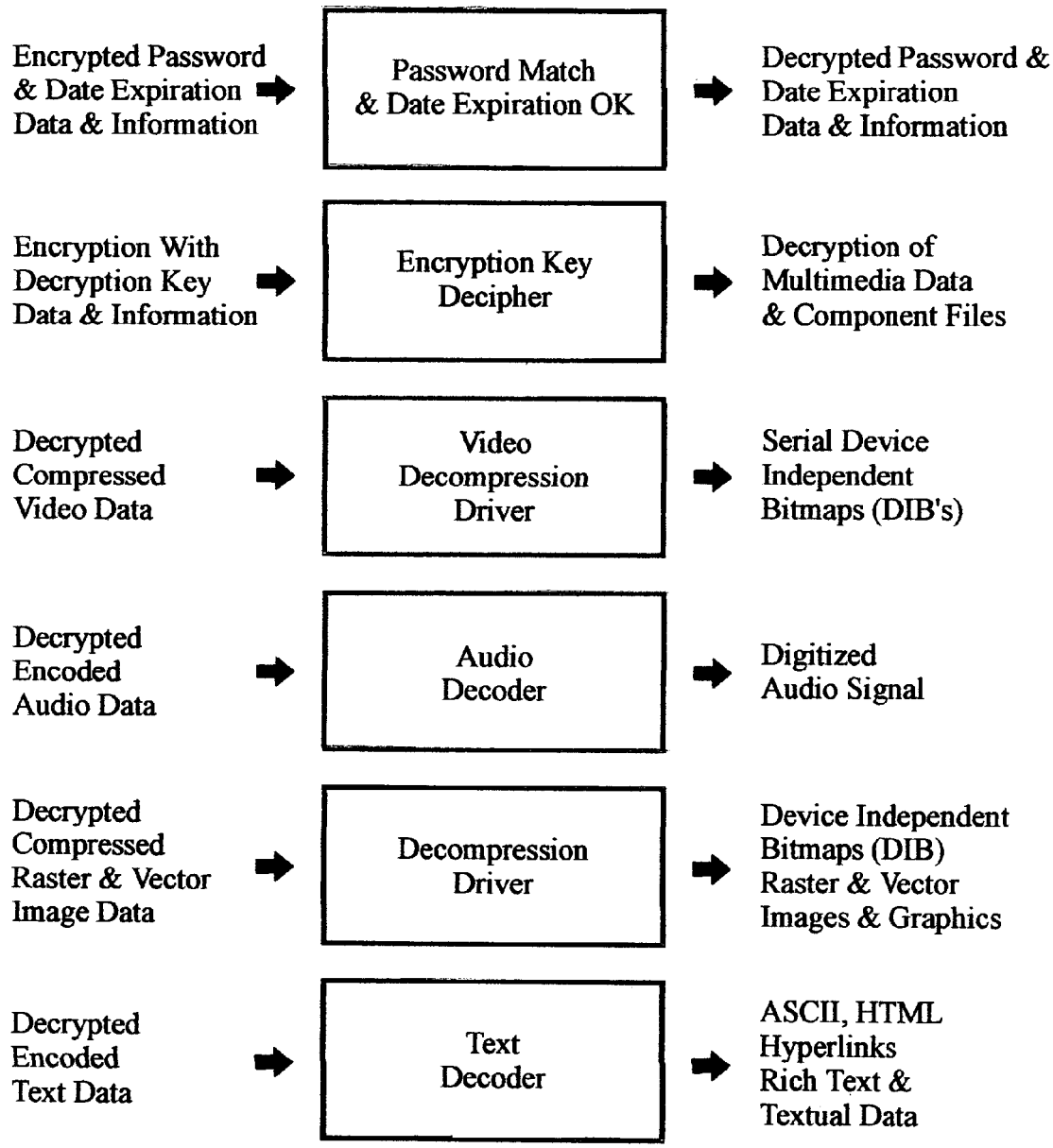
FIG. 3 illustrates the flow of component data through the respective decoding modules of a video clip display unit within an encrypted multimedia presentation transmission and distribution file.

When audio, video, still images, and text are digitized for storage and distribution, they are typically converted first from analog signals to raw data, and are subsequently compressed or encoded using algorithms which either reduce the amount of information required to represent the respective signal or remove information unnecessary for the regeneration of the respective signal at the desired level of quality. Video clip component data files typically contain data which has been subjected to one or more of such algorithms, and as a result, the video clip display unit must be capable of reversing the compression or encoding process to yield raw video clip component data. This process is carried out by units referred to as decoders or decompression drivers. FIG. 3 illustrates the analogous processes which the respective encrypted multimedia presentation video clip component data undergo to yield display-ready decrypted video clip data. FIG. 3 illustrates these processes as they would be applied to decrypted video clip component data in which the decrypted component data are maintained independently of one another. In an alternative embodiment, in which an interleaved storage format as described above is utilized, for example, a format in which audio and video data are interleaved, the decrypted interleaved data would be processed by a single decompression driver capable of decompressing such data.

Figure 4:
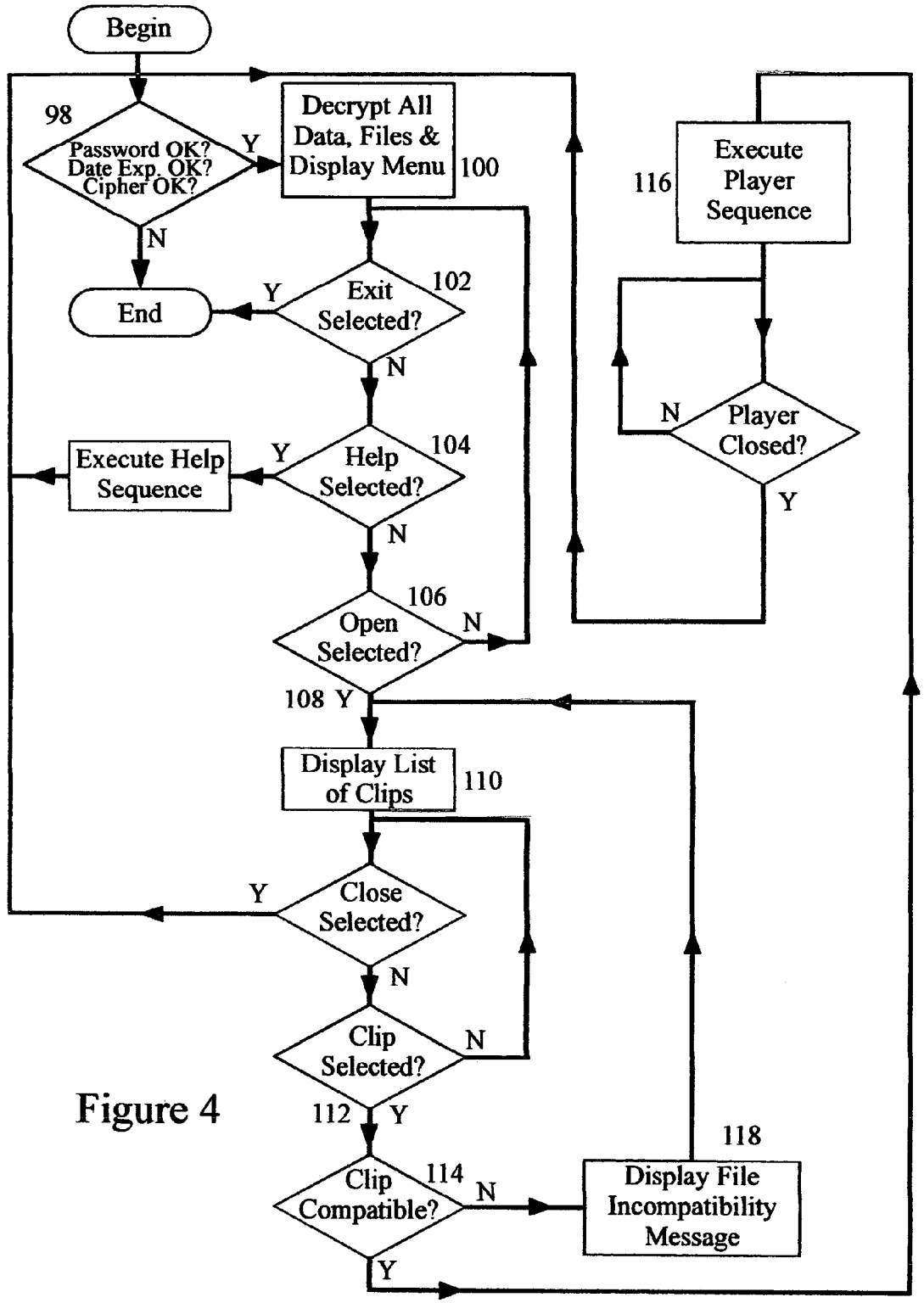
FIG. 4 illustrates a logical sequence of steps executed by a video clip display unit embodying the present invention to decrypt an encrypted multimedia transmission and distribution presentation file.

FIG. 4 presents a flow diagram which outlines the basic logical sequence of steps which are executed in a real-time decrypting video clip player apparatus embodying a system component of the invention. The sequence begins by 98 determining if the decrypted password and/or date and time information and data and if the decryption or cipher key within the encrypted multimedia presentation is correct. If not, the sequence ends. If correct, the sequence continues by opening the multimedia presentation file for access and then 100 decrypting component files within the encrypted multimedia presentation data file and presenting to a user of a video clip display unit the options of quitting 102 the video display unit, seeking help 104 from the unit as to how to operate the unit, or beginning 106 the sequence of steps necessary to display a decrypted video clip multimedia presentation. If the user chooses to begin the display sequence, the video clip display unit accesses its memory and presents 110 the user with a list of data files which the user may attempt to display. Upon the selection of a data file, the file is examined 114 by the video clip player to determine if the decrypted component data files utilize data formats which are compatible with the display unit. If the decrypted files are compatible, the video clip player initiates 116 the execution of a sequence of steps which will result in the display of the decrypted video clip. If the decrypted files are not compatible, an indication of incompatibility is displayed 118 and the user is prompted to make another selection.

Figure 5:
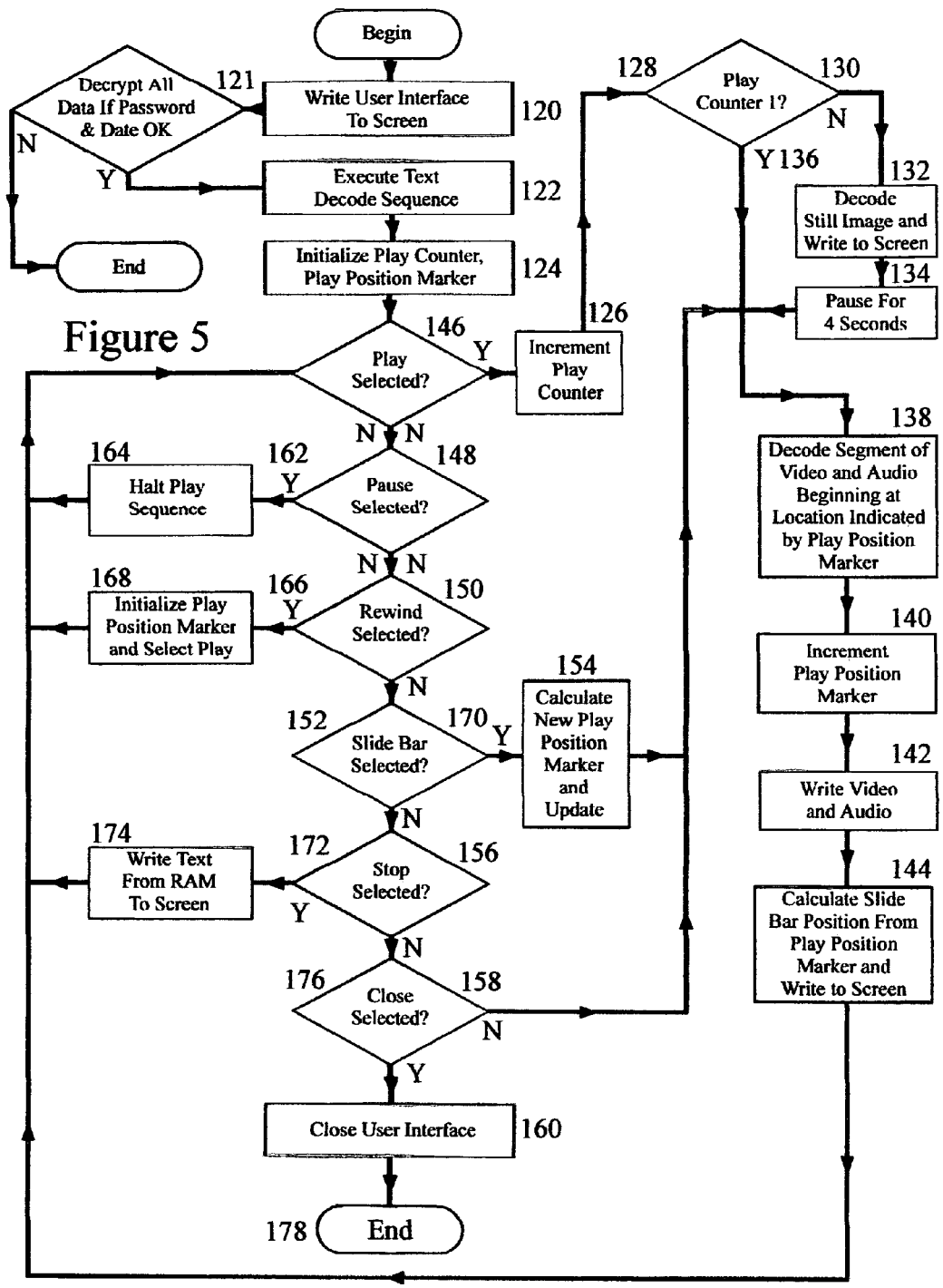
FIG. 5 illustrates a logical sequence of steps executed by the decrypted video clip display sequence of a specific embodiment of the present invention.

FIG. 5 presents a flow diagram which outlines the basic logical sequence of steps which are executed in the display sequence of a decrypting video clip player embodying the invention. The sequence begins by 121 determining if the decrypted password and/or date and time information and data and if the decryption or cipher key within the encrypted multimedia presentation is correct. If not, the sequence ends 178. If correct, the sequence continues by opening the multimedia presentation file for access and then 121 decrypting component files within the encrypted multimedia presentation data file and writing 120 a video clip display user interface to the display screen of the video clip display unit. The user interface, a specific embodiment of which is illustrated in FIG. 7, comprises a decrypted video display area 50 in which decrypted HTML, hyperlinks, Rich Text, ASCII and graphics, as well as decrypted raster still images and graphics and vector still or motion images and graphics, and decrypted video images may be displayed. The user interface further comprises first 52 and second 54 decrypted display areas in which decrypted text, HTML, hyperlinks, Rich Text and graphics components may be displayed. The user interface is further comprised of a user control array 70, which provides the user with controls which allow him to play 60, rewind 62, pause 64, stop 66 the video clip, show sequences of decrypted hyperlinked raster and vector images and graphics 67 and close 68 the video clip player user interface. The user interface is also comprised of a slide bar 58 located within a slide bar area 56 which allows the user to select a position within the decrypted video clip from which display is to be commenced.

Once the user interface has been written to the screen of the video clip display unit, a decrypted hyperlinked ASCII, HTML and Rich Text display sequence for displaying the decrypted textual formats within the user interface is initiated 122. The decrypted textual display sequence is discussed at greater length below. Subsequently, a play counter and play position marker are initialized 124. The play counter maintains a record of the number of times that the user has initiated the playing of the decrypted video and audio clip subsequent to selecting it for play and such data along with user demographic IP address client data is reported back to data collection servers. Upon each playing, the play counter is incremented 126. Also upon each playing, the value held by the play counter is examined 128. If the value of the play counter indicates 130 that the play request being responded to is the first of such requests, the video display unit will display 132 any decrypted raster or vector still and motion image and graphic, represented by decrypted raster and vector still and motion image data component in the decrypted video clip data file, for four seconds 134 prior to initiating real-time decryption and decoding 138 and display 142 of decrypted audio and video. If the play counter indicates 136 that the play request being responded to is not the first such request, the step of displaying the decrypted still image and decrypted still and motion vector image and graphic is skipped and the decrypted video and audio display sequence is initiated. Subsequent to the decoding 138 of a segment of decrypted audio and video, the play position marker is updated 140 to reflect the relative position within the entire decrypted video clip of the segment of decrypted audio and video to be displayed. A position for the slide bar within the slide bar area which is representative of the relative position of the decrypted audio and video segment being displayed within the decrypted video clip is then calculated 144 using the play position marker, and an updated slide bar is written to the user interface.

Subsequent to the initialization 124 of the play counter and play position marker, the display unit repeatedly scans the user control array for requests by the user for the display unit to perform certain predetermined functions. Specifically, the control array is monitored for requests 146 to play the decrypted video clip, for user requests 132 to view a sequence of decrypted still images, still and motion vector images and graphics, for requests 148 to pause the display of the decrypted video clip, for requests 150 to return to the beginning of the decrypted video clip and to recommence play from the beginning of the decrypted video clip, requests 152 to manipulate the position of the play position marker and to thereby select the commencement of display of the decrypted video clip at a particular location within the decrypted video clip, and requests 156 to Stop the display of the decrypted video clip. In addition, the display unit repeatedly scans for requests 158 to close the user interface.

Upon the detection 162 of a user request to pause the decrypted video clip, the flow of data is halted 164 and scanning of the user interface is resumed. Upon the detection 166 of a user request to rewind the decrypted video clip, the play position marker is reinitialized 168 and the decrypted play sequence is reinitiated. Upon the detection 170 of a user request to manipulate the position of the decrypted video clip segment by means of the slide bar, a new play position marker is calculated 154 based on the user-selected position of the slide bar and play of the decrypted video clip is continued from that updated point. Upon the detection 172 of a user request to stop the display of the decrypted video clip, play is halted and the decrypted textual data files and information represented by decrypted textual data maintained in RAM (described more fully below) is written 174 to the decrypted video display area shown in FIG. 7, Element 50. Upon the detection 176 of a user request to close the user interface, control of the display unit is returned 178 to the basic sequence as illustrated in FIG. 7 and as described above.

Figure 6:
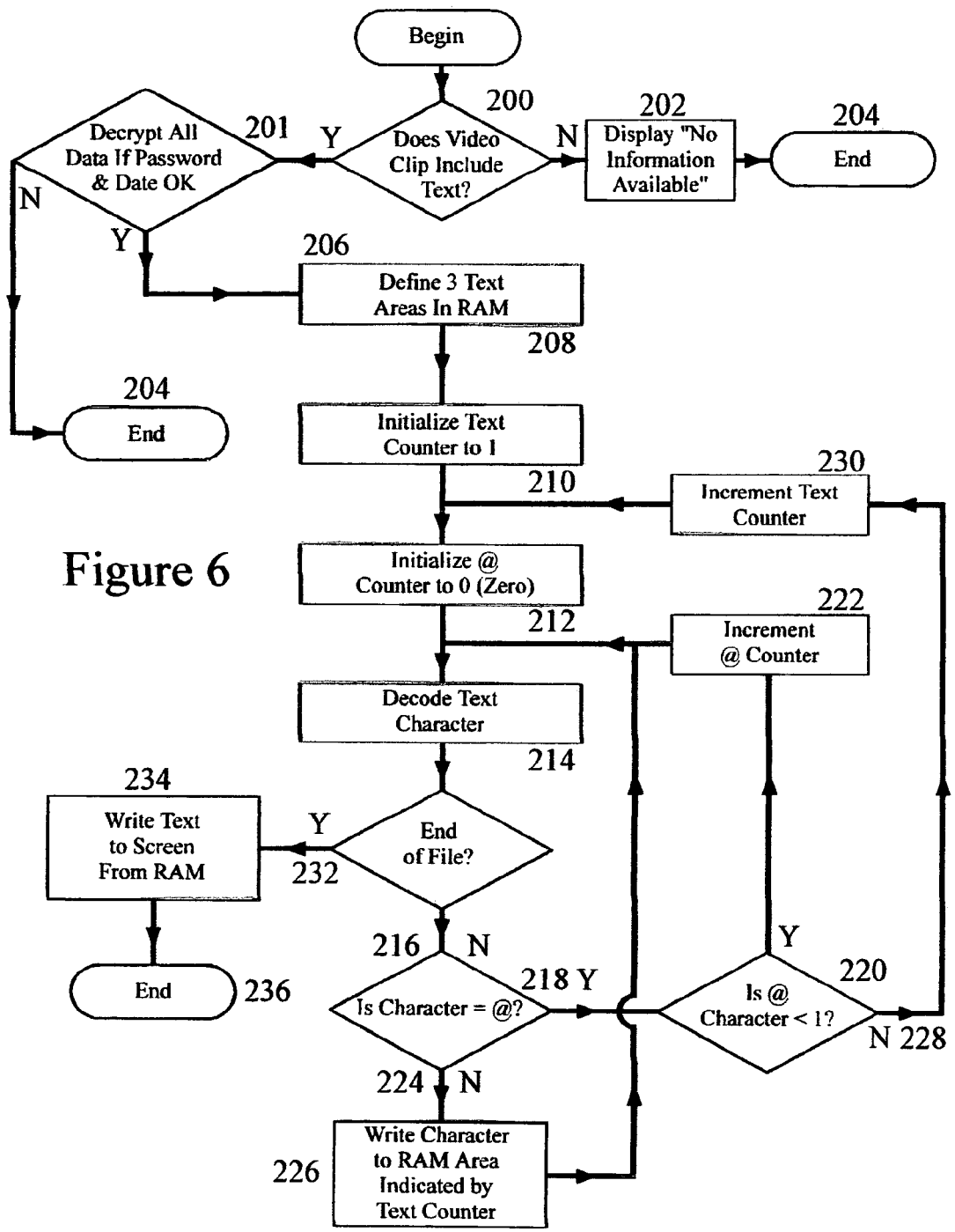
FIG. 6 illustrates a logical sequence of steps executed by the decrypted text display component of a specific embodiment of the present invention.

FIG. 6 presents a flow diagram which outlines the basic logical sequence of steps executed in the decrypted text decode and decrypted display sequence of a decrypting video clip player embodying the invention. The decrypted text decode sequence is initiated at the beginning of the decrypted video clip display sequence and begins with a determination 200 of whether the encrypted video clip data file includes data representative of decrypted text to be displayed in synchronization with the decrypted video and audio components of the decrypted video clip. If it is determined 202 that no decrypted text is included in the decrypted video clip, control is returned 204 to end the decrypted video clip display sequence as illustrated in FIG. 6.

If it is determined 201 that the decrypted date and time is correct and that the decrypted password matches that entered by the end user is correct then the encrypted multimedia presentation file is opened for decryption of the encrypted component files contained within and then 206 that the decrypted video clip data file includes decrypted data representative of decrypted textual information to be displayed in synchronization with the decrypted audio and decrypted video components of the encrypted video clip, then three decrypted text areas in the random access memory (RAM) of the decrypting video display unit are defined 208. A decrypted text counter is then initialized 210.

The decrypted text counter serves as a reference which indicates which of the three areas defined in RAM are to receive the decrypted text which is in the process of being decoded. A mark counter is then initialized 212. The mark counter provides a means for detecting marks which serve to demarcate distinct decrypted text data groups which are to be displayed in separate decrypted display areas on the user interface.

After the counters are initialized, a character of text is decrypted and decoded 214. If the decrypted character does not indicate 216 that it is the last character within the decrypted text file or data, it is examined 218, 220, 222 to determine whether it is one of a combination of decrypted characters which demarcates the division between decrypted text to be written to different decrypted text areas defined in RAM. If the character does not indicate 224 that further decrypted text should be written to the next decrypted text area in RAM, the decrypted decoded character is written 226 to the area indicated by the decrypted text counter and the following decrypted and encoded text character is decoded 214. If the character does indicate 228 that further decrypted decoded text should be written to the next decrypted text area defined in RAM, the decrypted text counter is incremented 230 and the next decrypted encoded text character is decrypted and decoded 214. When the end of the decrypted textual data and file is reached 232, the decrypted text represented by decrypted text data in each of the three decrypted text areas defined in RAM is written 234 to the three separate decrypted display areas on the user interface and control is returned 236 to the decrypted display sequence as illustrated in FIG. 5 and described above.

As the sequence of FIG. 5 illustrates, the decrypted and then decoded text is the first component of the encrypted multimedia presentation video clip file to be displayed. Decrypted text, again which may consist of HTML, Rich Text, hyperlinks and ASCII, stored as decrypted text data in the first RAM decrypted text area is displayed in the decrypted video display area 50, decrypted text stored as decrypted textual data in the second RAM decrypted text area is displayed in the first decrypted text display area 52, and decrypted text stored as decrypted text data in the third RAM decrypted text area is displayed in the second decrypted text area 54. When the decrypted video clip is played 60, and when images 67 are displayed, decrypted text displayed in the decrypted video display area 50 is overwritten by decrypted raster and vector still and motion images or decrypted video images. However, because the decrypted and decoded text is maintained in RAM for as long as the decrypted multimedia presentation clip remains active within the video clip multimedia presentation display unit, the decrypted textual data and information initially displayed in the decrypted video display area 50 may be redisplayed upon completion of play of the decrypted video clip, while decrypted text, HTML, Rich Text, hyperlinks, ASCII and decrypted images and graphics displayed in the decrypted text display areas 52 and 54 of the user interface remains displayed throughout the entirety of the display of the decrypted video clip.

SPECIFIC EMBODIMENT AND BEST MODE OF THE INVENTION

The information disclosed hereinafter, in combination with the detailed description of the invention provided above, describes a specific embodiment of the invention. This embodiment of the invention is the best mode of the invention known to the inventors as of the date of the filing of this application. This embodiment of the invention implements the disclosed process as computer software and utilizes a personal computer and other devices with a CPU, output display and audio capabilities, to display the encrypted multimedia presentation as the decrypted video clip display apparatus. It is optimized for use by a user of a personal computer and users of other devices with a CPU, output display and audio capabilities which is capable of running WINDOWS applications and other computer operating systems and which includes a modem capable of accessing computer network services such as the Internet or analogous subscription services such as America On Line (AOL). Alternately the invention decrypts and displays received encrypted multimedia presentation transmission files through intranets or LANs, wide area networks and other such networks, and such encrypted multimedia presentation files are also broadcast wirelessly to users of other devices equipped with wireless modems and antennas, such as PDAs, cellular phones, and portable computer systems. Further the encrypted multimedia presentation file is transmitted and broadcast using known telecommunication frequencies to CPU equipped set top decoders boxes via digital and analog satellite and cable means for television playback. Computer code facilitating the practice of this embodiment of the invention for such a system is available as a microfiche appendix to U.S. Pat. No. 5,983,236. The code consists of five modules which are written in the C++ computing language and in this embodiment are designed for use as WINDOWS applications and with translation, functions in other operating systems and program languages. The particular function of each module is described in headers provided at the top of each of the microfiched pages.

The decrypted video display process is preceded by acquisition of secure encrypted multimedia presentation video clip data files by the user. This is accomplished by establishing a connection between the computer and a computer network service such as the Internet, the process of which is well known. The user then uses well known searching techniques to locate files which are compatible with the decrypting multimedia presentation video clip player which is implemented on the user's personal computer and other such CPU equipped devices. This process is facilitated by assigning a unique two to three character file identifier extension to a single encrypted video clip data file which consists of the encrypted component data files joined in a single data file through the use of any well known archiving format such as LHARC, PK-ZIP, PGP encryption and other such archiving and encryption/decryption processes. Alternately, the end user may acquire the encrypted multimedia presentation video clip file through devices connected to the Internet wirelessly or directly from other user of such devices known as personal data assistants (PDAs) or cellular phones or other broadcast means using known telecommunication and broadcast frequencies. The encrypted multimedia presentation data file may also be shared without a file server between users, using either wired and wireless connections, through peer-to-peer file sharing networks.

The encrypted multimedia presentation video clip data file distribution and transmission process is further facilitated by assigning component data file identifiers which convey information as to the data format in which the encrypted video clip components are represented. In the present embodiment, this is accomplished by reserving the last three characters within the standard eight character file identifier for a three character code which reflects the type and quality of the audio signal represented therein. Combining these features, a user seeing that the audio portion of the encrypted video clip data file is identified, for example, as NAME.M3X, would recognize that the file is an audio data file which is representative of a stereo audio signal sampled at 192 bit rate samples per channel, having a frequency range of 44.1 kHz, a compression ratio of 4.5:1, and which is encoded using the MPEG 3 Audio standard with a 128 KBPS output or streaming data rate. Analogous naming conventions may be established for all component data files.

Subsequent to the transfer of the component data files of an encrypted video clip data file from any one of the methods above, including from a file server or broadcast point to the storage device of the users personal computer and memory of a wireless device, such processes being well known, the user may initiate the decryption and display of the encrypted video clip represented by the encrypted video clip data file by means of the process and apparatus disclosed herein. In the specific embodiment and best mode of the invention, this is achieved by a decrypting multimedia presentation video clip player implemented through computer code executed on the user's personal computer and other CPU enabled devices and their particular operating system. The code executes the sequences of steps described above and in FIGS. 4 through 6, operating on data of the type represented by FIG. 2 and in the manner illustrated by FIG. 3.

As one example, to allow a personal computer to display the various components of an encrypted multimedia presentation file video clip, the encrypted video clip data must be processed in a manner which decrypts and converts the encrypted component data into forms which are displayable by the computer. This requires decompression or decoding of the decrypted data as illustrated in FIG. 3. In the specific embodiment and best mode of the invention, the personal computer is programmed with an installed CODEC (compression and decompression program or method) to decompress and display decrypted video data stored in any one of a number of formats such as MPEG, AVI, QuickTime, DivX, WMV, ASF or other well known compression/decompression formats. The MPEG video data formats and other formats are well known video data formats which were developed and promulgated by the Moving Pictures Expert Group, while the .AVI, .WMV and .ASF formats were developed and promulgated by Microsoft and the QuickTime .MOV format developed and promulgated by Apple Computer. Consequently, the video decompression driver of the present embodiment as illustrated in FIG. 3 is a computer-implemented MPEG decompression driver which receives data in a number of MPEG formats and converts it to data in the Device Independent Bitmap (DIB) format. The DIB format is compatible with the display logic and circuitry found in personal computers as well as other devices equipped with a CPU, output display and audio capabilities such as PDAs or cellular phones. Computer and CPU implemented MPEG decompression drivers may be found, for example, as a standard component within computer operating system software packages, however, a host of various audio and video decompression drivers come prepackaged and preinstalled with many of today's computer systems and devices. Many more decompression drivers for various video and audio formats can be freely found and downloaded from the Internet, often at little to zero cost. For purposes of compatibility recognition, encrypted video component data files compatible with this embodiment of the invention are assigned the file identifier extension .NMS and other such unique identifiers.

Similarly, the specific embodiment and best mode of the invention is configured to first encrypt, decrypt and then decode audio data represented by data stored in the .WAV (WINDOWS AUDIO), .WMA, .MP2, .MP3 and other file formats commonly used for encoding digital audio. Decompression decoders for audio data stored in these and other formats are most often found in computer software operating systems distributed by the MICROSOFT Corporation or can be easily found on the Internet from other developers. All digital audio formats use the decoded audio data as a digitized data stream which may be converted by means of an analog to digital (A/D) converter into an audio signal.

Simultaneous decrypting, decoding and display of the audio and video components is implemented through the well known method of non-preemptive multitasking, such as is facilitated by the WINDOWS operating system, and other operating systems such as LINUX or those used on CPU equipped devices with output displays and audio capabilities such as found in personal data assistants (PDAs) and cellular phones, which function using WINDOWS CE and other operating systems. For purposes of compatibility recognition, audio component data files compatible with this embodiment of the invention are assigned the file identifier extension .WAV, however the invention is also functional using many other audio component data file formats such as .MP2, .MP3, .WMA, etcetera. The specific embodiment of the invention also is configured to decode still image data stored in the .JPEG, .JPG, .BMP, .PNG, and other raster graphic still image data formats as well as both still and motion vector image formats such as those formulated by Macromedia using their .FLA Flash graphics formats. JPEG is formulated and distributed by a subdivision of the makers of the MPEG video data formats, the Joint Photographic Expert Group, and JPEG decoders are well known. For purposes of compatibility recognition, still image component data files compatible with this embodiment of the invention are assigned the file identifier extension .NIM, however, in other embodiments and practical application, the invention decrypts and decodes many other image and graphic formats with extensions other than .NIM alone, as noted above.

While the above formats are presently supported in the specific embodiment and best mode of the invention, the disclosure provided herein will suggest alternative embodiments to those skilled in art of digital audio and video processing. Alternative audio and video data formats may be supported by substituting the proper decompression or decoding algorithms. For example, a decoder of still image data adapted for use with the .GIF, .TIF and .BMP formats could be substituted for the JPEG decoder of the present embodiment. Alternatively, multiple decompression drivers could be substituted which are capable of processing, decompressing and decoding audio and video data stored in both interleaved and non-interleaved formats. Examples of such interleaved and non-interleaved formats are .AVI (AUDIO VIDEO INTERLEAVE), .ASF and .WMV, produced by the MICROSOFT Corporation and MPEG2, produced by the Moving Pictures Expert Group.

Similarly, there are numerous well-known methods for the compression or encoding of ASCII text, HTML with hyperlinks, .RTF Rich Text and other such textual data which may be implemented. The present embodiment of the invention uses a simple mathematical alteration of any one of these textual data formats which is reversed upon decrypting and decoding. This alteration, along with encryption and decryption of the encrypted multimedia presentation data file, involves the permutation of each data word representing each textual character by the addition of a fixed four byte revolving key. This encoding does not change the length of the file. Decryption involves the simple subtraction of this same fixed revolving key from each character in the encrypted file and encrypted data files. Alternatively, decoding modules configured for use with any of the well-known encryption methods may be similarly adapted. For purposes of compatibility recognition, text component data files compatible with this embodiment of the invention are assigned the file identifier extension .NTX, .HTM, .HTML, .SHTML, .RTF, .RTX, .TXT and other text file format extensions.

FIG. 7 illustrates the video display unit user interface of the present embodiment of the invention for decrypting and displaying a secure interactive multimedia presentation. The interface is designed to be intuitively useable by users who are familiar with the WINDOWS style user interface and operating system and may be practiced using non-WINDOWS operating systems on CPU enabled devices. The user interface includes a large decrypted video display area 50 having a resolution at startup of 320 pixels×240 pixels. The user interface, however, can also display decrypted video at 160 pixels×120 pixels as well as display decrypted video at full screen mode, which in this display mode, effectively hides the user interface in its entirety. The user interface auto-redisplays when decrypted video clip playback is stopped manually by the user or when the decrypted video clip has reach the end point of the video clip. Below the decrypted video display area are situated a first decrypted textual data and graphical data display area 52 and a second decrypted textual data display and graphical data display area 54. Between the decrypted textual and graphical display areas and the decrypted video display area is the slide bar area 56 which includes a slide bar 58 for performing the functions described above. To the right of the video display area is the user control array 70 which includes a play button 60, rewind button 62, pause button 64, stop button 66, images display button 67, and close button 68. These buttons are intended to be operated by the user with the assistance of a mouse-directed pointer. The methods of such use and the technology for its implementation are well known in the art of computer programming.

Prior to the decrypted audio and video decoding sequence, the decrypting multimedia presentation video player's user interface of the present embodiment decrypts, decodes and displays decrypted textual and graphical information at startup of the user interface. The decrypted textual information and data is examined for markers which indicate points of demarcation between groups of decrypted text data representing groups of decrypted textual data and information in any one of the above noted textual formats and decrypted graphical data and information to be displayed in separate display areas. In practice it has been found that two consecutive characters such as "@@" and other such textual markers are sufficient to provide such demarcation. FIG. 6 illustrates the use of a counter which is referred to 220 to determine whether a point of demarcation has been detected. This serves to indicate that subsequent decrypted text should be written 224 to the next decrypted text area defined in RAM, until such time as a further demarcation point is detected.

The invention claimed is:

1. A method for providing a multimedia presentation to a computer user or to users of devices with a central processing unit equipped with an output display and audio device, comprising:

receiving from a server or other transmission devices or by radio and other frequencies in known broadcast and telecommunication spectrums, an encrypted multimedia presentation data file, the multimedia presentation data file which includes and contains or may contain elements of encrypted video component data and files, encrypted audio component data and files, encrypted text component data and files, encrypted hyperlinks and HTML component data and files, encrypted still raster image or graphic component data and files, encrypted motion or still vector image or graphic component data and files, and encrypted synchronization data;

displaying a graphical user interface comprising at least first and second display areas for display of decrypted multimedia component data or files and user display controls to interactively display a decrypted multimedia presentation; and concurrently displaying, in the first and second display areas, decrypted multimedia presentation component data or files respectively associated with the first and second display areas, in accordance with user commands entered through the user display controls and further in accordance with the decrypted synchronization data.

2. The method recited in claim 1,
wherein the graphical user interface further comprises a third display area; and
wherein displaying further comprises concurrently displaying in the third display area decrypted multimedia presentation components associated with the third display area.

3. The method recited in claim 1,
wherein the components of the encrypted multimedia presentation data file and its data and files contained within the single encrypted multimedia presentation data file are also stored in an encrypted format; and
wherein displaying comprises decrypting the encrypted multimedia presentation data file and sequentially extracting from the decrypted multimedia presentation data file, decrypted data portions and a decrypted file or files associated with concurrently decrypted and displayed multimedia presentation components.

4. The method recited in claim 1,
wherein the audio and video components of the encrypted multimedia presentation data file are encrypted and stored, and when decrypted are audio/video interleaved data and file formats; and
wherein the audio and video components of the encrypted multimedia presentation data file are encrypted and stored, and when decrypted are audio component files and decrypted video component files in non-interleaved component audio and video data and file formats; and
wherein displaying comprises decrypting and sequentially extracting, from the encrypted multimedia presentation data file, decrypted data portions or a decrypted file or files associated with decrypted concurrently displayed components; and
the method further comprising decrypting and extracting from the encrypted multimedia presentation data file, portions of decrypted audio data or a decrypted audio file or files synchronized with the decrypted displayed components; and
the method further comprising decrypting password data and time and or date expiration data and information to either confirm or deny extraction from the encrypted multimedia presentation data file, to confirm or deny the display or non-display of portions of decrypted data or decrypted component multimedia files contained within.

5. The method recited in claim 1, wherein the encrypted multimedia presentation data file is represented by a single data file identifier.

6. A system for providing a multimedia presentation to a computer user or to users of devices with a central processing unit with an output display and audio capabilities, comprising:
means for receiving from a server or other transmission devices or by radio frequency and other frequencies in known broadcast and telecommunication spectrums, an encrypted multimedia presentation data file, the multimedia presentation data file which includes and contains or may contain elements of encrypted video component data and files, encrypted audio component data and files, encrypted text component data and files, encrypted hyperlinks and HTML component data and files, encrypted still raster image or graphic component data and files, encrypted motion or still vector image or graphic component data and files, and encrypted synchronization data;
means for displaying a graphical user interface comprising at least first and second display areas and user display controls; and
means for concurrently displaying, in the first and second display areas, decrypted multimedia presentation components and data or files respectively associated with the first and second display areas, in accordance with user commands entered through the user display controls and further in accordance with the decrypted synchronization data.

7. The system recited in claim 6,
wherein the graphical user interface further comprises a third display area; and
wherein displaying further comprises concurrently displaying in the third display area decrypted multimedia presentation components, data or files associated with the third display area.

8. The system recited in claim 6,
wherein the components of the encrypted multimedia presentation data file and its data and files contained within the encrypted multimedia presentation data file are stored in an encrypted format; and
wherein displaying comprises decrypting the encrypted multimedia presentation data file and sequentially extracting from the decrypted multimedia presentation data file, decrypted data portions and or a decrypted file or files associated with decrypted and concurrently displayed multimedia presentation components.

9. The system recited in claim 6,
wherein the audio and video components of the encrypted multimedia presentation data file are encrypted and stored, and when decrypted are audio/video interleaved data and file formats; and
wherein the audio and video components of the encrypted multimedia presentation data file are encrypted and stored, and when decrypted are audio component files and decrypted video component files in separate non-interleaved component audio and video data and file formats; and
wherein displaying comprises decrypting and sequentially extracting, from the encrypted multimedia presentation data file, decrypted data portions or a decrypted file or files associated with decrypted concurrently displayed components; and
the system further comprising decrypting and extracting from the encrypted multimedia presentation data file, portions of decrypted audio data or a decrypted audio file or files synchronized with the decrypted displayed components; and
the system further comprising decrypting password data and time and or date expiration data and information to either confirm or refute extraction from the encrypted multimedia presentation data file, to confirm or refute the display or non-display of portions of decrypted data or decrypted component multimedia files contained within.

10. The system recited in claim 6, wherein the encrypted multimedia presentation data file is represented by a single data file identifier.

11. A computer readable storage medium having stored therein machine readable data representing control programming for controlling performance of a system for providing a secure interactive multimedia presentation, the system providing the functions of:

receiving from a server or other transmission devices or by radio frequency and other frequencies in known broadcast and telecommunication spectrums, an encrypted multimedia presentation data file, the multimedia presentation data file which includes or may contain elements of encrypted video component data and files, encrypted audio component data and files, encrypted text component data and files, encrypted hyperlinks and HTML component data and files, encrypted still raster image or graphic component data and files, encrypted motion or still vector image or graphic component data and files, and encrypted synchronization data;

displaying a graphical user interface comprising at least first and second display areas and user display controls; and concurrently displaying, in the first and second display areas, decrypted multimedia presentation component data or files respectively associated with the first and second display areas, in accordance with user commands entered through the user display controls and further in accordance with the decrypted synchronization data.

12. The computer readable storage medium recited in claim 11, wherein the graphical user interface further comprises a third display area; and wherein displaying further comprises concurrently decrypting and displaying in the third display area decrypted multimedia presentation components associated with the third display area.

13. The computer readable storage medium recited in claim 11, wherein the component data and files of the multimedia presentation data file are stored in an encrypted format that may contain encrypted password or date expiration data and information; and wherein displaying comprises sequentially extracting, from the encrypted multimedia presentation data file, decrypted data portions and or decrypted component data files associated with concurrently displayed and decrypted multimedia components.

14. The computer readable storage medium recited in claim 11, wherein the component data and files of the multimedia presentation data file are stored in an encrypted format that may contain encrypted password or date expiration data and information; and wherein displaying comprises sequentially extracting, from the encrypted multimedia presentation data file, decrypted data portions and or decrypted component data files associated with concurrently displayed and decrypted components; and the method further comprising extracting, from the encrypted multimedia presentation data file, portions of decrypted audio data or a decrypted audio file or files synchronized with the decrypted displayed components.

15. The computer readable storage medium recited in claim 11, wherein the encrypted multimedia presentation data file is represented by a single data file identifier.

\* \* \* \* \*